United States Patent [19]

Tootle

[11] Patent Number: 4,884,493
[45] Date of Patent: Dec. 5, 1989

[54] FLUID ACTUATOR INCLUDING A BALLISTICALLY TOLERANT ROD GLAND BEARING

[75] Inventor: James N. Tootle, Kalamazoo, Mich.
[73] Assignee: Pneumo Abex Corporation, Boston, Mass.
[21] Appl. No.: 214,401
[22] Filed: Jul. 1, 1988
[51] Int. Cl.$^4$ .......................... F01B 29/08; F01B 7/00; F16J 15/18
[52] U.S. Cl. ....................................... 92/128; 92/151; 92/165 R; 92/168; 277/58; 277/DIG. 10; 403/2
[58] Field of Search ............. 92/128, 146, 151, 165 R, 92/168, 169.1; 277/58, DIG. 10; 403/2, 224

[56] References Cited

U.S. PATENT DOCUMENTS

| | | | |
|---|---|---|---|
| 2,429,426 | 10/1947 | Phillips et al. | 92/168 X |
| 2,836,443 | 5/1958 | Farmer | 92/168 X |
| 3,195,907 | 7/1965 | Eckenrod | 277/188 |
| 3,474,630 | 10/1969 | Pogonowski | 61/46.5 |
| 3,884,127 | 5/1975 | Simmons | 92/151 |
| 3,892,253 | 7/1975 | Covarrubias | 137/68 |
| 4,103,900 | 8/1978 | Wittersheim | 277/2 |
| 4,111,441 | 9/1978 | Sick et al. | 277/183 |
| 4,119,017 | 10/1978 | Nusbaumer et al. | 92/165 P R X |
| 4,122,759 | 10/1978 | Runkel et al. | 92/168 |
| 4,167,135 | 9/1979 | Lindsey | 92/61 |
| 4,185,542 | 1/1980 | York et al. | 92/166 |
| 4,211,151 | 7/1980 | Wallischeck | 92/146 |
| 4,237,203 | 12/1980 | Tsuchida et al. | 429/122 |
| 4,300,439 | 11/1981 | Degnan et al. | 92/146 |
| 4,449,446 | 5/1984 | Degnan et al. | 92/146 |
| 4,581,981 | 4/1986 | Kusiak | 92/151 |

FOREIGN PATENT DOCUMENTS 2317666 10/1973 Fed. Rep. of Germany .... 92/165 R

Primary Examiner—Edward K. Look
Assistant Examiner—Mark A. Williamson
Attorney, Agent, or Firm—Renner, Otto, Boisselle & Sklar

[57] ABSTRACT

Fluid actuator includes shear pins or threaded fasteners between a rod gland and a rod gland bearing which cause the rod gland bearing to separate from the rod gland in response to a predetermined jam clearance force being applied to the rod gland bearing upon engagement of a rod deformation either exteriorly or interiorly of the actuator with the rod gland bearing to clear such rod deformation. The shear pins or threaded fasteners are sized to withstand the usual internal pressures acting on the rod gland bearing. However, whenever a piston rod deformation engages the rod gland bearing, the entire actuator force is available to shear the shear pins or threaded fasteners which frees the rod gland bearing to allow movement of the rod gland bearing with the piston rod to clear the rod deformation. A single retainer plate may be used to retain both a plurality of headed shear pins and a retaining wire for the rod gland. Alternatively, a plurality of fasteners may be used in tension to secure a radial flange on the rod gland bearing to a radial end face of the rod gland. Also, a reduced area thickness may be provided on the radial flange in substantial axial alignment with a static seal between the rod gland and rod gland bearing to cause shearing of the radial flange at such reduced area thickness when a predetermined axial inward jam clearance force is applied to the piston rod in response to a rod deformation exteriorly of the actuator engaging the axial outer end of the rod gland bearing to free the rod gland bearing for movement with the rod to clear such rod deformation.

23 Claims, 3 Drawing Sheets

FLUID ACTUATOR INCLUDING A BALLISTICALLY TOLERANT ROD GLAND BEARING

BACKGROUND OF THE INVENTION

This invention relates generally, as indicated, to a fluid actuator especially of the type used to control the movements of flight control surfaces of military aircraft and the like. More particularly, the invention relates to the provision of a ballistically tolerant rod bland bearing for such actuator, to prevent the actuator from jamming in the event that the piston rod is hit by a ballistic projectile or the like.

Should a ballistic projectile such as a bullet or shrapnel hit the actuator piston rod, it will destroy the precision ground sealing surface thereon and produce petals of metal or large burrs which will cause the piston rod to jam in the rod gland and freeze the actuator against movement.

If the raised petal or other such abutment on the rod (hereafter referred to as a rod deformation) is not too large, this type of actuator jam can be reduced or eliminated by fabricating the rod gland out of a frangible material which permits portions of the rod gland to break off when forcibly contacted by the rod deformation, thus continued movement of the rod deformation past the rod gland. To prevent failure of the rod gland due to normal burst and fatigue requirements, the rod gland must be able to withstand the usual internal actuator pressure loads but not the required maximum jam clearance load. In a conventional frangible gland design, these restrictions only allow the frangible rod gland to clear a relatively small deformation on the piston rod, thus making it unsuitable for larger rod deformations.

Heretofore, it was known that larger rod deformations could be cleared utilizing frangible sections or a frangible pin to retain the rod glands in place during normal operation but which will rupture or break in response to an axial inward jam clearance force applied thereto. However, such rod glands were normally supported so that the frangible means would not break when relatively high axial outward forces are applied to it, making it unsuitable for applications in which the actuator is susceptible to rod damage interiorly of the actuator. Also, there is a continuing need for more simplified rod gland designs including a rod gland bearing which will separate from the rod gland in response to a jam clearance force being applied to the rod gland bearing during movement of the piston rod in one or both directions to clear relatively large deformations of the piston rod either exteriorly or interiorly of the cylinder.

SUMMARY OF THE INVENTION

With the foregoing in mind, it is a principal object of this invention to provide novel rod gland designs including a rod gland bearing which separates from the rod gland in response to a predetermined axial outward and/or inward jam clearance force being applied to the rod gland bearing to clear rod deformations either exteriorly or interiorly of the actuator cylinder.

In accordance with one aspect of the present invention, the rod gland bearing is retained in the rod gland by a plurality of shear pins or threaded fasteners sized to withstand the usual internal pressures acting on the rod gland bearing. However, whenever a piston rod deformation engages the rod gland bearing, the entire actuator force is available to shear the shear pins or threaded fasteners which frees the rod gland bearing to allow movement of the rod gland bearing with the piston rod to clear the rod deformation.

In accordance with another aspect of the invention, a single retainer may be used to retain both a plurality of headed shear pins and a retaining wire for the rod gland.

Further in accordance with the invention, a plurality of tensioned fasteners may be used to secure a radial flange on the rod gland bearing to a radial end face of the rod gland.

The fasteners are provided with carefully controlled sections of reduced thickness which cause uniform tension failures of all of the fasteners when a predetermined axial outward jam clearance force is applied to the piston rod in response to a rod deformation interiorly within the actuator cylinder engaging the axial inner end of the rod gland bearing during axial outward movement of the rod to free the rod gland bearing for movement with the rod to clear a rod deformation interiorly of the cylinder.

In accordance with still another aspect of the invention, the rod gland bearing flange may be provided with a reduced area thickness in substantial axial alignment with a static seal between the inner diameter (I.D.) of the rod gland and outer diameter (O.D.) of the rod gland bearing to permit shearing of the flange at such reduced area thickness when a predetermined axial inward jam clearance force is applied to the piston rod in response to a rod deformation exteriorly of the actuator engaging the axial outer end of the rod gland bearing to free the rod gland bearing for movement with the rod to clear a rod deformation exteriorly of the cylinder.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
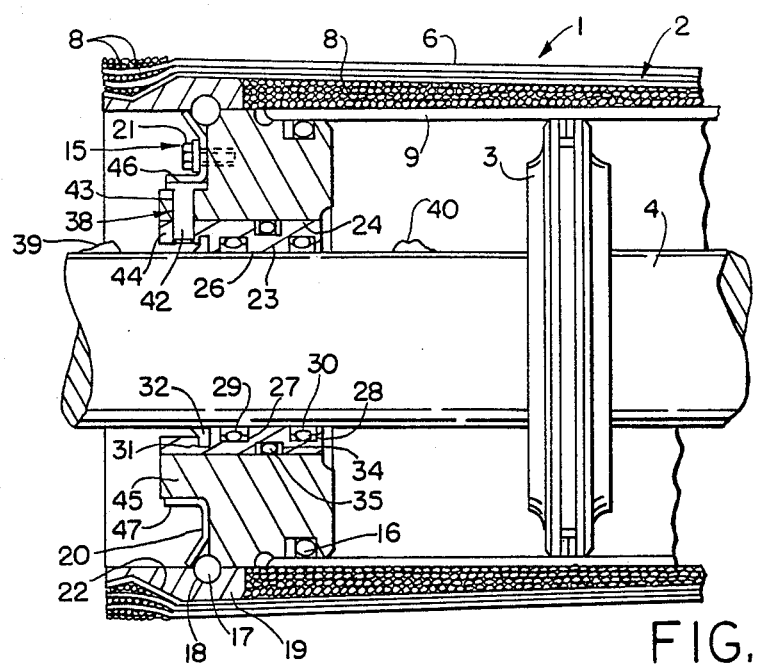
FIG. 1 is a fragmentary longitudinal section view through a fluid actuator incorporating one form of ballistically tolerant rod gland bearing in accordance with this invention.
Figure 2:
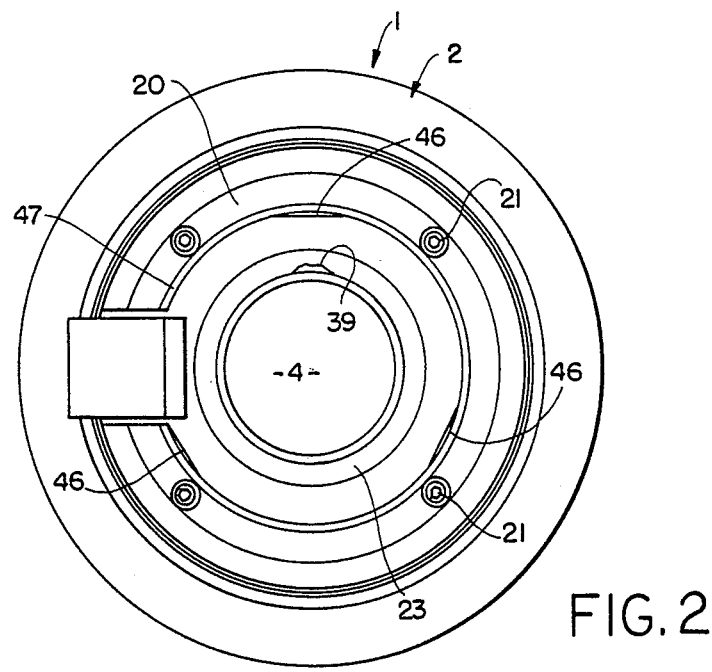
FIG. 2 is an end elevation view of the actuator of FIG. 1 as seen from the left end thereof.

Referring now in detail to the drawings, an initially to FIGS. 1 and 2, there is shown a fluid actuator 1 including a cylinder housing 2 containing a piston 3 and piston rod 4 extending axially therefrom. In the embodiment disclosed herein, the cylinder housing 2 is desirably made of relatively high strength to weight longitudinal and/or biased tension and circumferential hoop stress winding 6, 8 of suitable composite fibrous materials for reduced weight and to provide increased fatigue resistance, damage tolerance and ballistic tolerance. The I.D. of the cylinder housing 2 is lined with an impermeable inner barrier liner member 9 to prevent fluid seepage through the relatively porous composite material of the cylinder housing. Such liner member may be fabricated from metal or organic materials, and may or may not be bonded to the I.D. of the cylinder housing as desired.

Adjacent the outboard end of the cylinder housing 2 of FIGS. 1 and 2 there is shown one form of rod gland 15 in accordance with this invention. Both the liner member 9 and longitudinal and hoop stress windings 6 and 8 surrounding same extend coaxially beyond the axially inner end of the rod gland 15, with a suitable seal 16 between the O.D. of the rod glad 15 and I.D. of the liner member 9 to prevent fluid leakage therebetween. Rod gland 15 may be retained within the outboard end of the cylinder housing 2 as by means of a retaining wire 17 received in an internal annular groove 19 in a metal end ring 19. The remaining 17 may be held in place as by a retaining plate 20 removably attached to an outer end face of the rod gland 15 by a plurality of screws 21 (see FIG. 2).

The outer end of the metal end ring 19 desirably has an external tapered surface 22 facing outwardly of the rod gland 15 for engagement by the ends of the longitudinal tension windings 6 and attached thereby as by means of additional hoop stress windings 8 interposed between the layers of longitudinal tension windings 6.

In accordance with the present invention, the piston rod 4 is guided during its movement by a rod gland bearing 23 retained within a coaxial bore 24 in the rod gland 15. The rod gland bearing 23 has a coaxial bore 26 therethrough of a size closely matching the O.D. of the piston rod 4 to provide a close sliding fit therebetween. Also, one or more internal grooves are desirably provided in the I.D. of the rod gland bearing 23 for receipt of dynamic ring seals therein in sliding sealed engagement with the O.D. of the rod 4. In the FIGS. 1 and 2 embodiment, two such internal grooves 27, 28 containing respective dynamic seals 29, 30 are shown. Another internal groove 31 may also be provided in the rod gland bearing 23 adjacent the axial outer end thereof for receipt of a wiper ring 32.

To prevent fluid leakage between the rod gland 15 and bearing 23, a static seal may be provided therebetween. To that end, the O.D. Of the bearing 23 is shown as having an external groove 34 therein for receipt of a static seal 35 in sealing engagement with the I.D. of the rod gland 15.

Rod gland bearing 23 is retained in the rod gland bore 24 by retainer means 38 which permit the rod gland bearing 23 to separate from the rod glad 15 whenever, during powered movement of the piston rod 4 in either direction, a predetermined jam clearance force is transmitted to either end of the rod gland bearing upon engagement of a rod deformation 39 or 40 either externally or internally of the cylinder housing 2 with the rod gland bearing. This frees the rod gland bearing 23 for movement with the rod 4 to clear the rod deformation 39 or 40.

In the embodiment shown in FIGS. 1 and 2, the retainer means 38 consists of a plurality of substantially uniformly circumferentially spaced shear pins 42 received in radially aligned openings 43, 44 in the rod gland 15 and rod gland bearing 23, respectively. Preferably, the radial holes 43 are in a reduced diameter cylindrical end portion 45 at the axial outer end of the rod gland 15 for ease of insertion of the shear pins 42 into the aligned holes 43, 44 from the O.D. of the reduced diameter portion. Shear pins 42 are desirably provided with heads 46 at the outer ends thereof to limit the extent to which the pins can be inserted into the holes 454 in the rod gland bearing 23. Also, such heads 46 permit the shear pins to be retained in place by the retainer plate 20 which desirably has an axial hub portion 47 overlying such shear pin heads 46 when the shear pins are inserted in the aligned holes.

Preferably, three such shear pins 42 are provided, each sized by the hydraulic burst pressure force on the rod gland bearing 23 and all designed to fail in shear at a hydraulic pressure slightly greater than the burst pressure of the cylinder. Accordingly, should the piston rod 4 become damaged by gunfire or the like, causing the piston rod 4 to jam into the rod gland bearing 23, the available hydraulic force acting across the effective area of the piston head 3 will be sufficient easily to shear the headed shear pins 42, thus freeing the rod gland bearing 23 from the rod gland 15 for movement with the piston rod 4.

If the rod deformation 40 occurs interiorly of the cylinder housing 2, the shear pins 42 will be sheared during the extend stroke upon engagement of the rod deformation 40 with the axial inner end of the rod gland bearing 23. Conversely, if the rod deformation 39 occurs exteriorly of the cylinder housing, the shear pins 42 will be sheared on the retract stroke upon engagement of the rod deformation 39 with the axial outer end of the rod gland bearing 23. During such piston rod movement, the piston rod 4 will be guided by the piston head 3 and a bearing (not shown) on the opposite end of the cylinder housing 2 if a balanced are actuator 1 is provided. Also, the piston head width should desirably be kept relatively narrow so that extreme deflection does not cause the piston 3 to jam in the cylinder housing 2.

Figure 3:
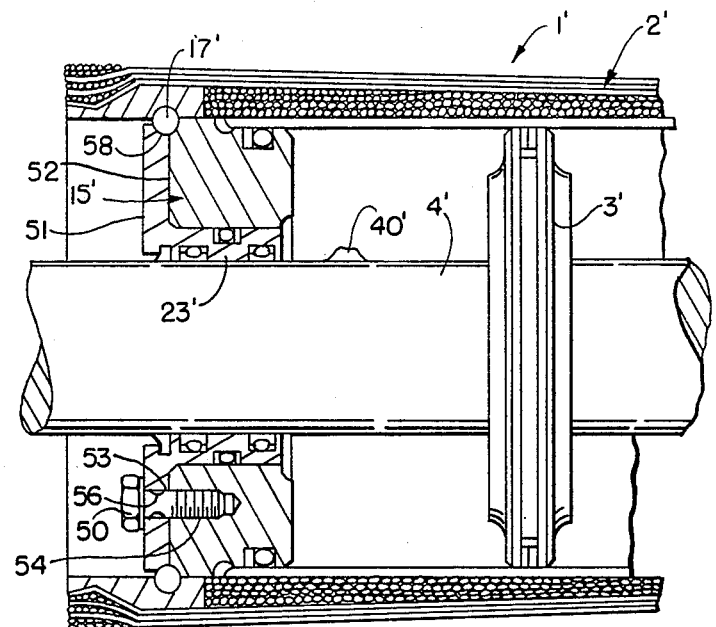
FIG. 3 is a fragmentary longitudinal section view through a fluid actuator incorporating another form of ballistically tolerant rod gland bearing in accordance with this invention.
Figure 4:
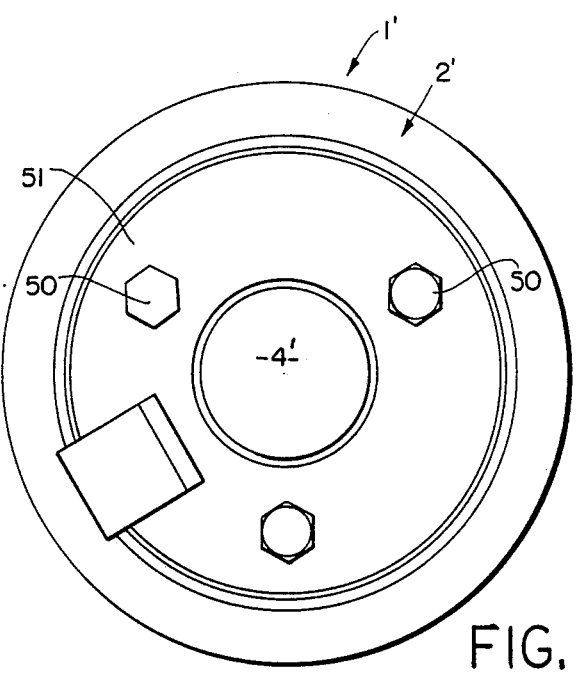
FIG. 4 is an end elevation view of the fluid actuator of FIG. 3 as seen from the left end thereof.

Another form of rod gland 15' in accordance with this invention is shown in FIGS. 3 and 4 which is very similar to that shown in FIGS. 1 and 2, and accordingly the same reference numerals followed by a prime symbol are used to designate like parts. However, the rod gland 15' of FIGS. 3 and 4 differs from the rod gland 15 of FIGS. 1 and 2 in that a plurality of tensioned fasteners 50 are used in place of the shear pins 42 to secure the rod gland bearing 23' to the rod gland 15'. To that end, the rod gland bearing 23' is provided with a radial flange 51 at the axial outer end thereof which radially overlaps a radial end face 52 on the rod gland 15'. Also, a plurality of circumferentially spaced axially extending holes 53 extend through the flange 51, corresponding in number to the number of threaded fasteners 50 to be used (three such fasteners 50 being preferred). In like manner, the radial end face 52 of the rod gland 15' has a corresponding number of aligned and tapped openings 54 therein for threaded engagement by the threaded fasteners 50 to secure the rod gland bearing 23' to the rod gland 15'. Each threaded fastener 50 is provided with a carefully controlled section 46 of reduced thickness which produces tension failures of all of the fasteners when an axial outward jam clearance force is applied to the piston rod 4' in response to a rod deformation 40' interiorly of the cylinder housing 2' engaging the inner end of the rod gland bearing 23'. This frees the rod gland bearing 23' and allows axial outward movement of the rod gland bearing along with the rod 4' to clear the rod deformation 40'.

This particular rod gland design eliminates the need for a reduced diameter cylindrical end portion on the rod gland 15'. Also, the need for the retainer plate 20 of the FIGS. 1 and 2 embodiment is eliminated simply by extending the radial flange 51 of the rod gland bearing 23' radially outwardly substantially the full radial extent of the rod gland end face 52 and providing an external groove 58 therein for holding the retainer wire 17' in place.

However, the rod gland 15' of the FIGS. 3 and 4 embodiment has the disadvantage that the rod glad bearing 23' will only prevent jamming due to rod deformation 40' interiorly of the cylinder housing 2' and not exteriorly thereof. Thus, if there should be an exterior rod deformation that engages the rod gland bearing 23' shown in FIGS. 3 and 4 during axial inward movement of the piston rod 3', the overlapping engagement between the bearing flange 51 and rod gland 15' will prevent further axial inward movement of the rod 4' irrespective of the amount of actuator force applied thereto. Accordingly, this particular rod gland configuration is primarily intended for applications where the actuator 1' is normally in a retracted position when it is likely to be hit by gunfire, as would be the case with a landing gear or flap cylinder or the like.

Figure 5:
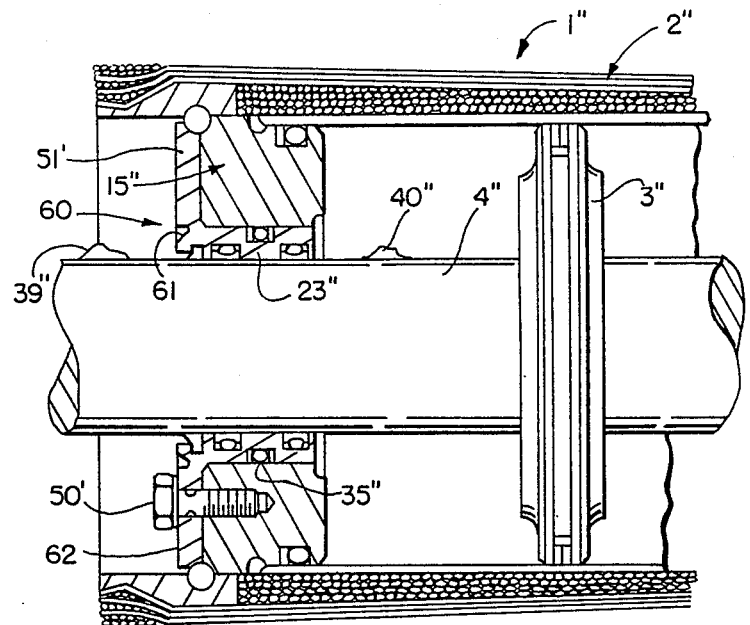
FIG. 5 is a fragmentary longitudinal section view through a fluid actuator incorporating still another form of ballistically tolerant rod gland bearing in accordance with this invention.
Figure 6:
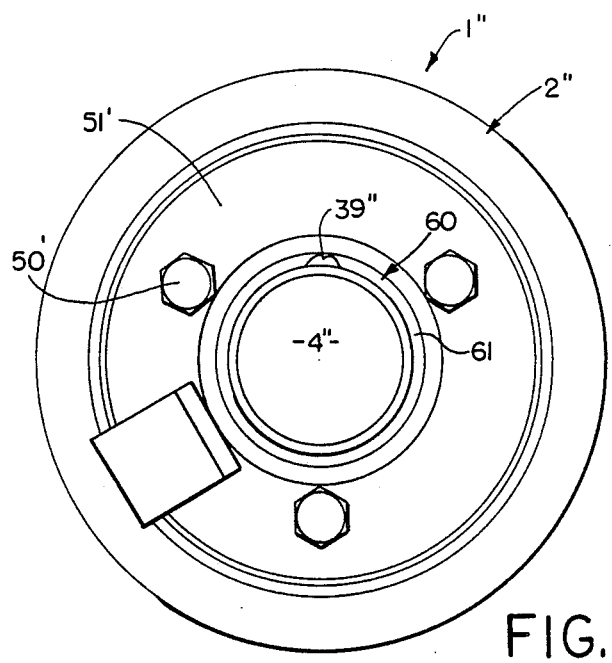
FIG. 6 is an end elevation view of the fluid actuator of FIG. 5 as seen from the left end thereof.

In FIGS. 5 and 6 there is shown still another form of rod gland 15" in accordance with this invention which is substantially identical to that shown in FIGS. 3 and 4 and accordingly the same reference numerals followed by a single or double prime symbol are used to designate like parts. However, in this embodiment the rod gland bearing 23" is provided with a reduced thickness 60 formed by an annular groove 61 in the outer end face 62 of the annular flange 51' in substantial axial alignment with the static seal 35" between the I.D. of the rod gland 15" and O.D. of the rod gland bearing 23". Such a reduced thickness s61 causes shearing of the flange 51' at such reduced section 60 when a predetermined axial inward jam clearance force is applied to the piston 4", which occurs when a rod deformation 39" exteriorly of the cylinder 2" engages the outer end of the rod gland bearing 23", thus freeing the rod gland bearing 23" and allowing it to move axially inwardly along with the piston rod 4" to clear such a rod deformation. Accordingly, the rod gland bearing 23" of the FIGS. 5 and 6 embodiment, like that of the FIGS. 1 and 2 embodiment, will clear rod deformation 39",40" exteriorly of the cylinder housing as well as interiorly thereof.

The rod gland bearing 23" of the FIGS. 5 and 6 embodiment should of course be made of a material which is both a good bearing material and has consistent shear properties. Also, the reduced section 60 should have careful tolerances and finishes to provide consistent, predictable shear loads.

From the foregoing, it will now be apparent that the various rod gland and rod gland bearing configurations of the present invention provide a relatively effective and simple means of eliminating actuator jams caused by rod deformations either exteriorly or interiorly of the actuator or both.

Although the invention has been shown and described with respect to several preferred embodiments, it is obvious that equivalent alterations and modifications will occur to other skilled in the art upon the reading and understanding of the specification. The present invention includes all such equivalent alterations and modifications, and is limited only by the scope of the claims.

What is claimed is:

1. A fluid actuator comprising a cylinder housing, a piston axially movable within said housing, a rod gland at one end of said housing, a separately formed rod gland bearing axially insertable into said rod gland, a rod extending from said piston through said rod gland bearing, and retainer means for retaining said rod gland bearing against axial movement relative to said rod gland, said retainer means including means for freeing said rod gland bearing from said rod gland upon engagement of a deformation on said rod with said rod gland bearing during axial movement of said rod in one direction for movement of said rod gland bearing with said rod to clear such deformation.

2. The actuator of claim 1 wherein said means for freeing said rod gland bearing comprises shear pin means received in radially aligned openings in said rod gland and rod gland bearing.

3. The actuator of claim 2 wherein there are a plurality of circumferentially spaced radially aligned openings in said rod gland and rod gland bearing for receipt of a plurality of said shear pin means therein.

4. The actuator of claim 2 wherein said rod gland has a reduced diameter cylindrical end portion containing said openings in said rod gland to facilitate insertion of said shear pin means in said aligned openings from the exterior of said reduced diameter cylindrical end portion.

5. The actuator of claim 1 wherein said means for freeing said rod gland bearing from said rod gland comprises tensioned fastener means for securing said rod gland bearing to said rod gland.

6. A fluid actuator comprising a cylinder housing, a piston axially movable within said housing, a rod gland at one end of said housing, a rod gland bearing within said rod gland, a rod extending from said piston through said rod gland bearing, and retainer means for retaining said rod gland bearing within said rod gland, said retainer means including means for freeing said rod gland bearing from said rod gland upon engagement of a deformation on said rod with said rod gland bearing during axial movement of said rod in one direction for movement of said rod gland bearing with said rod to clear such deformation, said means for freeing said rod gland bearing comprising shear pin means received in radially aligned openings in said rod gland and rod gland bearing, said rod gland having a reduced diameter cylindrical end portion containing said openings in said rod gland to facilitate insertion of said shear pin means in said aligned openings from the exterior of said reduced diameter cylindrical end portion.

7. The actuator of claim 6 wherein said shear pin means have heads thereon to limit the extent to which said shear pin means extend within said openings in said rod gland bearing.

8. The actuator of claim 7 further comprising means overlapping said shear pin heads for retaining said shear pin means in said aligned openings.

9. The actuator of claim 8 wherein said means for retaining said shear pin means comprises an annular retainer plate having an axial hub portion surrounding said reduced diameter cylindrical end portion in overlying relation to said shear pin heads when said shear pin means are inserted in said aligned openings in said rod gland and rod gland bearing.

10. The actuator of claim 9 further comprising wire means receivable in an internal groove in said housing for retaining said rod gland at said one end of said housing, said retainer plate including means for holding said wire means in said groove.

11. The actuator of claim 10 further comprising screw means for removably attaching said retainer plate to a radial end face of said rod gland.

12. The actuator of claim 11 wherein said reduced diameter cylindrical end portion extends axially outwardly from said radial end face.

13. A fluid actuator comprising a cylinder housing, a piston axially movable within said housing, a rod gland at one end of said housing, a rod gland bearing within said rod gland, a rod extending from said piston through said rod gland bearing, and retainer means for retaining said rod gland bearing within said rod gland, said retainer means including means for freeing said rod gland bearing from said rod gland upon engagement of a deformation on said rod with said rod gland bearing during axial movement o f said rod in one direction for movement of said rod gland bearing during axial movement of said rod in one direction for movement of said rod gland bearing with said rod to clear such deformation, said means for freeing said rod gland bearing from said rod gland comprising tensioned fastener means for securing said rod gland bearing to said rod gland.

14. The actuator of claim 13 wherein said fastener means includes a section of reduced thickness which produces tension failures in said fastener means upon engagement of a deformation on said rod with said rod gland bearing during axial movement of said rod in one direction to free said rod gland bearing for movement with said rod to clear such deformation.

15. The actuator of claim 13 wherein said rod gland bearing has a radial flange which radially overlaps a radial end face on said rod gland, said fastener means extending axially through said radial flange for securing said radial flange to said radial end face of said rod gland.

16. The actuator of claim 15 wherein said radial flange is at an axial outer end of said rod gland bearing, and said radial end face is at an axial outer end of said rod gland.

17. The actuator of claim 16 wherein said radial flange extends radially outwardly substantially the full radial extent of said radial end face of said rod gland.

18. The actuator of claim 17 further comprising wire means receivable in an internal groove in said housing for retaining said rod gland at said one end of said housing, said wire means being h eld in said groove by a radial outer edge portion of said radial flange.

19. The actuator of claim 15 wherein said radial flange has a plurality of circumferentially spaced axially extending opening therethrough for receipt of a corresponding number of said fastener means, and said radial end face of said rod gland has a corresponding number of tapped holes in alignment with said openings in said radial flange for threaded receipt of said fastener means.

20. The actuator of claim 19 wherein there are three of said fastener means substantially uniformly circumferentially spaced around the periphery of said radial flange.

21. The actuator of claim 13 wherein said rod gland bearing has a radial flange which radially overlaps a radial end face on said rod gland, and said fastener means extend through said radial flange for securing said radial flange to said radial end face, said fastener means being subject to tension failures upon engagement of a deformation on said rod with one end of said rod gland bearing during axial movement of said rod toward the end of said rod gland which is radially overlapped by said radial flange to free said rod gland bearing from said rod gland for movement with said rod.

22. The actuator of claim 21 wherein said radial flange has a section of reduced thickness which causes shearing of said radial flange at said section upon engagement of a deformation on said rod with the other end of said rod gland bearing during axial movement of said rod in the opposite direction to free said rod gland bearing from said rod gland for movement with said rod to clear such deformation.

23. The actuator of claim 22 further comprising fluid seal means between said rod gland and rod gland bearing, said section of reduced thickness being in substantial coaxial alignment with said seal means.

* * * * *